United States Patent Office 2,700,658
Patented Jan. 25, 1955

2,700,658
POLYMERIC COMPOUNDS

Frank K. Signaigo, Kenmore, N. Y., assignor, by mesne assignments, to the United States of America as represented by the Secretary of the Navy No Drawing. Original application February 1, 1952, Serial No. 272,245, now Patent No. 2,685,574, dated August 3, 1954. Divided and this application March 17, 1954, Serial No. 420,759

1 Claim. (Cl. 260—79.1)

This application is a division of application Serial Number 272,245, filed February 1, 1952, for "Polymeric Compounds," and of application Serial Number 634,394, filed December 11, 1945, for "Polymer Polysulfides Containing Ether Groups" now Patent 2,586,182.

My invention relates to a new class of products and methods whereby they may be produced. More particularly, it relates to polyalkylene polysulfides having lateral ether groups and methods whereby they may be prepared.

In my copending application Serial Number 470,909 of December 31, 1942, now abandoned, polymeric ethylene polysulfides and a method whereby they may be prepared is disclosed. These compounds are useful for the preparation of coatings, impregnations, cementing materials, and the like. They are also valuable as oil resistant rubber-like materials suitable for the manufacture of oil resistant hose. I have discovered that compounds having particular usefulness for the above mentioned purposes and which are suitable for convenient preparation are obtained when the polymeric ethylene polysulfides contain lateral ether groups.

The polyalkylene polysulfides having lateral ether groups as contemplated in this invention have recurring structural units of the formula:

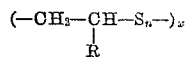

where $n$ is a small integer greater than 1, R a radical containing an ether group, and $x$ is the number of recurring structural units in the polymer.

In accordance with another aspect of my invention the preparation of polyalkylene polysulfides having lateral ether groups is obtained by reaction of alkali metal polysulfide with a dihalogenoalkyl ether, as illustrated by the equations:

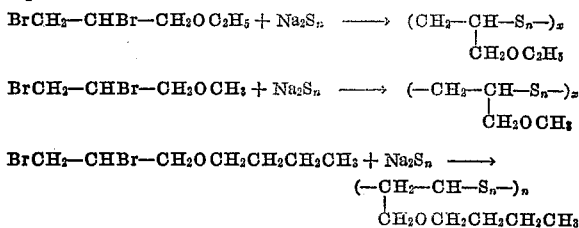

The preparation of my new class of products may be illustrated by the following examples:

*Example 1.*—A mixture of 252 parts (1 mol+5%) of sodium sulfide ($Na_2S.9H_2O$), 68 parts (2 mols+5%) of sulphur, and 90 parts of water is stirred at 50° C. until all the sulphur is dissolved. To form magnesium hydroxide, which acts as a dispersing agent in the subsequent polymer formation, 12 parts of sodium hydroxide are added, followed by the gradual addition with stirring of a solution of 30.6 parts of magnesium chloride ($MgCl_2.6H_2O$) in 40 parts of water. To the solution of sodium polysulfide maintained at about 50° C. is then added with stirring, over a period of 3 to 4 hours, 246 parts (1 mol) of 2,3-dibromopropyl ethyl ether (prepared by brominating allyl ethyl ether in chloroform). The polymeric sulfide which separates is digested by stirring the reaction mixture at 70–75° C. for 7 to 8 hours. After cooling, the contents of the reaction vessel are poured into a large volume of water and the solid is washed with water by decantation until the supernatant layer becomes pale yellow, then air-dried.

*Example 2.*—A mixture of 252 parts of sodium sulfide ($Na_2S.9H_2O$) 68 parts of sulfur, and 90 parts of water is stirred at 50° C. until all the sulfur is dissolved. 16 parts of sodium hydroxide are added, followed by the gradual addition with stirring of 41 parts of magnesium chloride ($MgCl_2.6H_2O$). To the solution of sodium polysulfide maintained at about 50° C. are then added with stirring, over a period of about 5 hours, 232 parts of 2,3-dibromopropyl methyl ether (prepared by brominating allyl methyl ether in chloroform). The resulting polymeric sulfide which separates is digested by stirring the reaction mixture at 70–75° C. for about 9 hours. After cooling, the polymeric sulfide is filtered from the reaction mixture, washed once with a mixture of equal parts of water and ethyl alcohol, and dried at reduced pressure in a desiccator at room temperature, 193 parts of polymeric product being obtained.

*Example 3.*—A solution of sodium polysulfide containing magnesium hydroxide is prepared in the manner described in the preceding example from 134 parts of sodium sulfide ($Na_2S.9H_2O$), 35 parts of sulfur, 50 parts of water, 8 parts of sodium hydroxide, and 21 parts of magnesium chloride hexahydrate. To this solution, maintained at about 50° C., are added with stirring over a period of 2 hours, 132 parts of 2,3-dibromopropyl isopropyl ether (prepared by brominating allyl isopropyl ether in chloroform). The polymeric sulfide which separates is digested by stirring the reaction mixture for about 7 hours at 70–75° C. After cooling, the contents of the reaction vessel are poured into water, the solid washed with water and air dried.

*Example 4.*—A mixture of 264 parts of sodium sulfide ($Na_2S.9H_2O$) and 71 parts of sulfur is melted together by stirring at 50° C. To this solution of sodium polysulfide, maintained at about 50° C., is added dropwise with stirring, over a period of 5 hours, a solution of 274 parts of 2,3-dibromopropyl n-butyl ether (prepared by brominating allyl n-butyl ether in chloroform) in 198 parts of methanol. The reaction mixture is then stirred at 70–75° C. for an additional 18 hours to complete the formation of the polymer. After standing at room temperature for about 16 hours, the polymeric sulfide separates from the reaction mixture as a clear taffy-like material. It is washed by trituration with water and then with methanol, and is finally dried in a desiccator at reduced pressure.

The above described processes are only by way of illustration. The polymeric alkoxyethylene polysulfides derived from the methyl, isopropyl, and n-butyl ethers of 2,3-dibromopropanol can be prepared by the process of the above examples. Polysulfides containing aromatic, alkyl-aromatic-cycloaliphatic or heterocyclic ether groups may also be prepared by generally similar processes from dihalogenoalkyl ethers having such groups attached to the ether oxygen atom.

My new polymeric alkylene polysulfides having lateral ether groups are viscous resins, insoluble in water but soluble in some organic solvents, as for example dioxane. They may be used as intermediates in the preparation of vicinal dimercapto ethers by catalytic hydrogenation in the presence of a sulf-active catalyst, such as cobalt sulfide. The preparation of such monomeric ethers is disclosed by A. A. Pavlic and W. J. Peppel in application Ser. No. 568,064, filed December 13, 1944, now Patent No. 2,397,698, issued April 2, 1946.

My invention is capable of wide variations from the form described, its scope being defined in the appended claim.

What is claimed is:

The process of preparing a polymeric (n-butoxymethyl)-ethylene polysulfide characterized by the steps of melting together sodium sulfide and sulfur in approximately the following proportions:

| | Parts |
|---|---|
| Sodium sulfide ($Na_2S.9H_2O$) | 264 |
| Sulfur | 71 | adding dropwise over a period of about 5 hours at 50° C. a solution of 274 parts 2,3-dibromopropyl n-butyl ether in 198 parts methanol, and digesting the mixture by stirring for about 18 hours at 70–75° C.

No references cited.